United States Patent
Köhler et al.

(10) Patent No.: US 8,607,224 B2
(45) Date of Patent: Dec. 10, 2013

(54) SYSTEM FOR PACKAGING NATIVE PROGRAM EXTENSIONS TOGETHER WITH VIRTUAL MACHINE APPLICATIONS

(75) Inventors: Dirk Köhler, Hamburg (DE); Karsten Litsche, Schöpstal (DE); Mathias Winkler, Leipzig (DE)

(73) Assignee: Yahoo! Inc., Sunnyvale, CA (US)

( * ) Notice: Subject to any disclaimer, the term of this patent is extended or adjusted under 35 U.S.C. 154(b) by 1035 days.

(21) Appl. No.: 12/473,914

(22) Filed: May 28, 2009

(65) Prior Publication Data

US 2010/0306759 A1    Dec. 2, 2010

(51) Int. Cl.
*G06F 9/445* (2006.01)

(52) U.S. Cl.
USPC ........... 717/174; 717/168; 717/178; 717/173; 718/1; 709/204; 709/205

(58) Field of Classification Search
USPC ........................ 717/168–178; 709/204–205
See application file for complete search history.

(56) References Cited

U.S. PATENT DOCUMENTS

| | | | |
|---|---|---|---|
| 6,295,638 B1 * | 9/2001 | Brown et al. | 717/148 |
| 6,826,385 B2 * | 11/2004 | Kujala | 455/13.1 |
| 8,136,100 B1 * | 3/2012 | Goldman | 717/136 |
| 2003/0145123 A1 * | 7/2003 | Berndt et al. | 709/310 |
| 2004/0158813 A1 * | 8/2004 | Xia et al. | 717/116 |
| 2005/0021876 A1 * | 1/2005 | Asai et al. | 710/1 |
| 2005/0172286 A1 * | 8/2005 | Brumme et al. | 718/1 |
| 2005/0282532 A1 * | 12/2005 | Dotan et al. | 455/418 |
| 2008/0005794 A1 * | 1/2008 | Inoue et al. | 726/22 |
| 2008/0016504 A1 * | 1/2008 | Cheng et al. | 717/168 |
| 2008/0127169 A1 * | 5/2008 | Malasky et al. | 717/174 |
| 2009/0193411 A1 * | 7/2009 | Saxton et al. | 717/174 |

OTHER PUBLICATIONS

C. E. Ortiz, "Invoking Platform Services in MIDP 2.0", http://developers.sun.com/mobility/midp/ttips/platform, 3 pages, printed on May 13, 2009.
Nick, "J2ME/MIDP Programming for Mobile Phones—Good, Bad and Ugly", http://myhowto.org/java/23-j2memidp-programming-for-the-cell-phones.., 8 pages, printed on May 13, 2009.
Drewry, "Will J2ME Deliver?", http://www.wirelessdevnet.com/articles/j2me_orative/index.html, 3 pages, printed on Apr. 8, 2009.

* cited by examiner

*Primary Examiner* — Van H Nguyen
*Assistant Examiner* — Tina Huynh
(74) *Attorney, Agent, or Firm* — Weaver Austin Villeneuve & Sampson LLP

(57) ABSTRACT

Methods and apparatus are described for packaging native program extensions with a virtual machine application. The application is distributed in an application package containing application code that runs in a virtual machine, native code that runs outside the virtual machine, and other resources. When the application requires access to native features of the underlying device not provided in the virtual machine, the native code is installed and executed. The virtual machine application accesses the native features by communicating with the native code running outside the virtual machine via inter-process communication.

20 Claims, 6 Drawing Sheets

SYSTEM FOR PACKAGING NATIVE PROGRAM EXTENSIONS TOGETHER WITH VIRTUAL MACHINE APPLICATIONS

BACKGROUND OF THE INVENTION

The present invention relates to mobile device computing, and more specifically to portable applications bundled with native program extensions for enhanced functionality.

Unlike desktop computers, mobile devices such as cell phones are not built on a common platform. Most desktop machines are based on the Intel x86 architecture, sharing a common instruction set, bus model, and standard components such as mouse, keyboard, hard drive, display, etc. Operating systems are fairly standardized as well, with the majority of desktop machines running some version of Microsoft Windows. By contrast, mobile devices are built around a wide variety of different hardware and operating systems. Processors from Texas Instruments, Qualcomm, Siemens/BenQ, Broadcom, Marvell, and others are commonly used. Proprietary platforms and nonstandardized components such as Global Positioning System (GPS) receivers and cameras further complicate the picture. Many mobile device vendors develop their own operating systems or license operating systems from multiple providers. This creates a fragmented market of mobile devices lacking common hardware and software for application developers to target.

To address this problem, several common software platforms have been developed. Each platform provides a standard application programming interface (API) for accessing functionality of an underlying device. Applications run on top of the platform. When an application wants to use a device feature, it calls the platform API. The platform translates the API call into native instructions for the particular device being used. Applications written to the platform can run on a variety of devices without dealing with hardware and operating system differences between devices. Examples of such platforms include Sun Microsystem's Java Platform Micro Edition (Java ME or J2ME), Google's Android, and Qualcomm's Binary Runtime Environment for Wireless (BREW).

Platforms often do not expose every feature of the underlying device. Some device-specific features are covered up by the abstraction of a common API. Others may be omitted from the platform to provide a "lowest common denominator" of features which exist in every device. Still others may not be widely used enough or exist at all when the platform is finalized. Additionally, code translating an API call into a native feature must be written for each device. If this translation code has not been written for a particular device, or if the device vendor did not load the translation code onto the device, then a feature may be unavailable even though both the platform and the underlying device support it.

For example, Mobile Information Device Profile (MIDP) is a set of Java ME interfaces. The first version of MIDP did not provide an API for full-screen graphics control, inhibiting the development of games on the Java ME platform. MIDP 2.0 corrected this, along with adding support for audio and multimedia playback, communications over HTTPS and other network protocols, and allowing MIDP applications to register with the operating system as handlers for certain types of network traffic. These features were available on devices before MIDP 2.0, but MIDP 1.0 did not provide a way to access them.

When a software platform does not provide features supported by the underlying device, an application programmer's options depend on the platform. Some platforms compile applications into native code for each device, providing only a cross-platform compatibility library for accessing device functions. In this case, the developer may be able to access unsupported features by calling the device operating system directly. The downside of this approach is code that is not portable to other devices. However, platforms such as Java ME do not even allow this option.

Java ME applications run inside a Java virtual machine. The virtual machine runs applications in Java bytecode, not native compiled code. The device processor won't run bytecode, and the virtual machine won't run native code. This technique, called sandboxing, prevents Java applications from accessing the device hardware or operating system directly. Sandboxed applications can only access what the virtual machine allows them to access. For instance, web browsers run Java virtual machines that forbid accessing the local file system.

A Java ME application has more limited options for accessing features outside the common platform. Java ME defines a number of optional libraries for features like Bluetooth and instant messaging. These libraries are not available on every device. A device manufacturer wishing to support such optional features can include the corresponding Java ME libraries on their devices. However, many manufacturers choose not to include such libraries, even though their devices support the underlying features.

Vendors can also create their own Java APIs for accessing device features. For instance, Research in Motion includes proprietary Java libraries for accessing additional features of their Blackberry devices. Such proprietary libraries are less desirable because they are limited to a single vendor, hampering portability of Java ME applications. In either case, these options are beyond the control of the application developer. Vendors decide whether to provide such features.

Java Native Interface (JNI) provides a third option for accessing features and services outside a java virtual machine in certain circumstances. With JNI, Java programs may directly execute native code. The Java virtual machine loads the native code into the running virtual machine process's address space and transfers control to it. When done, the native code must return control to the Java virtual machine. This differs from running Java bytecode, which runs on the Java virtual machine itself. JNI defeats any sandbox protection since native code is not bound by the restrictions imposed by the virtual machine on Java bytecode. Native code can perform any operation that any other program can perform. Because of this, high-security Java virtual machines such as the ones in web browsers do not allow JNI.

Many mobile devices do not provide JNI. Java ME defines two device configurations, Connected Device Configuration (CDC) and Connected Limited Device Configuration (CLDC). CDC runs on high-end mobile devices such as some smart phones with ample computing power and memory. CLDC runs on basic mobile devices, including the majority of cell phones. Because CLDC devices lack the needed power and memory, JNI is generally not available on them. Manufacturers may optionally add JNI to a CLDC device, but few do. As before, the decision to support JNI is not under the developer's control. Application developers targeting a wide variety of cell phones can not rely on JNI for interfacing with native code.

SUMMARY OF THE INVENTION

According to the present invention, methods and apparatus for providing native functionality to a virtual machine application on a computing device are provided. This involves running the virtual machine application in a virtual machine on the computing device. The virtual machine is not configured to provide access to one or more native features of the device. The application detects whether native code configured to provide access to the native features is installed on the computing device. If the native code is not detected, the application installs native code embedded in an application package corresponding to the virtual machine application onto the computing device. The installation is initiated by the virtual machine application and may be aided by another component such as an operating system. Once the native code is installed, the application accesses the native features by communicating with the native code.

Other embodiments of the invention include a computing device which provides native functionality to a virtual machine application. The computing device comprises one or more processors and one or more memories. The one or more memories contain a data structure and computer program instructions which run on the device. The data structure comprises a virtual machine application package containing at least a virtual machine application and native code for the device. A first portion of the computer program instructions comprise an operating system when executed by the computing device. The operating system provides a communication mechanism for processes on the computing device to communicate. The operating system further provides an installation mechanism to install programs on the computing device. A second portion of the instructions implements a virtual machine when executed by the device. The virtual machine runs virtual machine applications in a restricted environment which does not provide access to one or more native features of the computing device. A third portion of the instructions comprises the native code stored in the data structure. The native code provides access to the native features via the communication mechanism provided by the operating system when executed on the device outside the virtual machine. A fourth portion of the instructions comprises the virtual machine application. When executed by the virtual machine, the virtual machine application detects whether the native code is installed on the computing device. If the native code is not installed, the virtual machine application will install the native code embedded in the virtual machine application package onto the device via the installation mechanism provided by the operating system. When the native code is installed and loaded, the virtual machine application will access the native features by communicating with the native code via the communication mechanism provided by the operating system.

According to another embodiment of the invention, a computer program product comprising at least one computer-readable storage medium is described for providing native functionality to a virtual machine application. The computer program product comprises a data structure and computer program instructions that run on the computing device. The computing device includes an operating system which provides a communication mechanism for processes on the computing device to communicate and an installation mechanism to install programs on the computing device. The computer device also includes a virtual machine which runs a virtual machine application. This virtual machine does not provide access to one or more native features of the computing device. The data structure of the computer program product comprises a virtual machine application package containing the virtual machine application and native code. The computer instructions of the computer program product comprise the virtual machine application and native code. When executed by a processor of the computing device, the native code provides access to the one or more native features via the communication mechanism of the operating system. When executed by the virtual machine, the virtual machine application detects whether the native code is installed on the computing device. If the native code is not detected, the virtual machine application installs the native code embedded in the virtual machine application package via the installation mechanism provided by the operating system. When the native code is installed and loaded, the virtual machine application accesses the native features by communicating with the native code via the communication mechanism provided by the operating system.

A further understanding of the nature and advantages of the present invention may be realized by reference to the remaining portions of the specification and the drawings.

DETAILED DESCRIPTION OF SPECIFIC EMBODIMENTS

Figure 1:
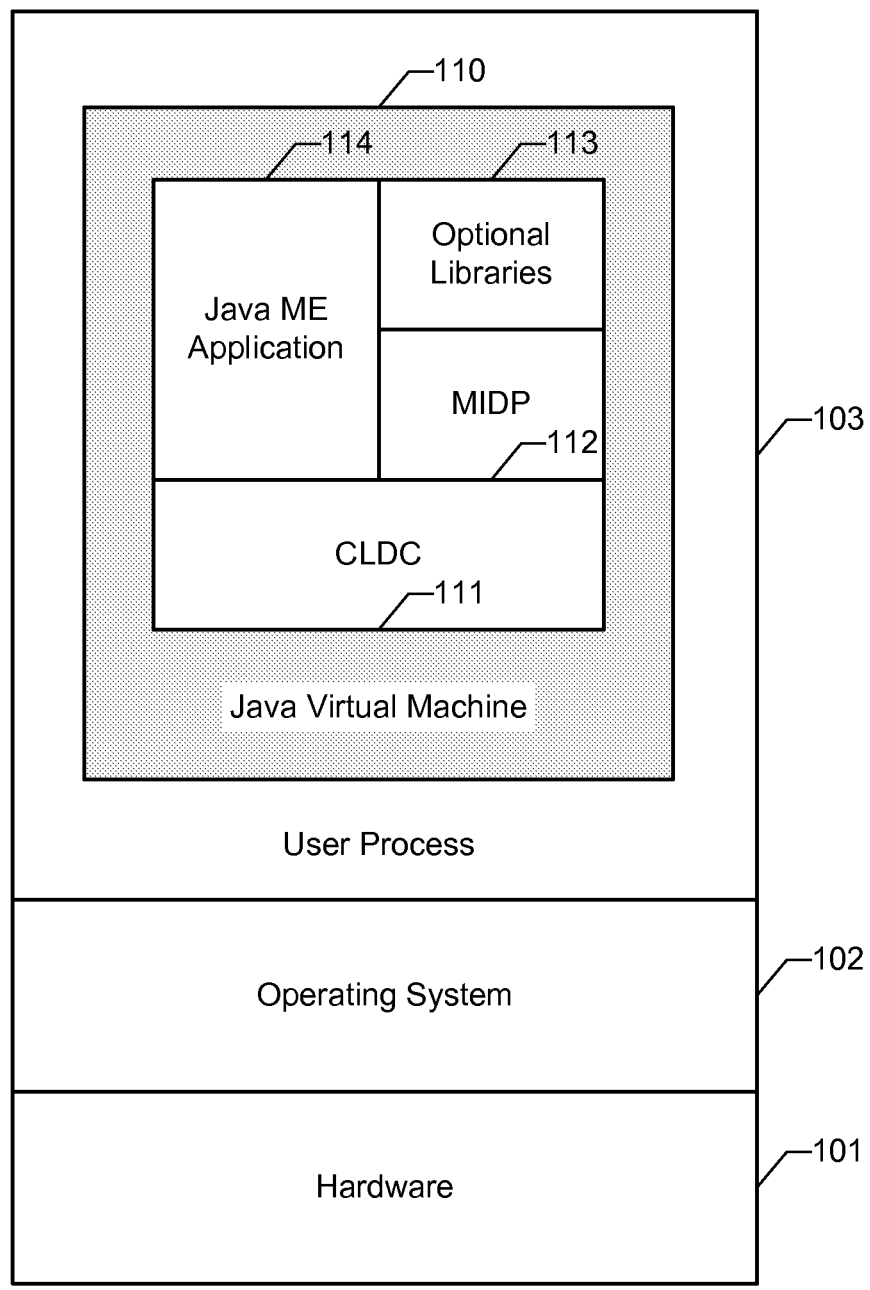
FIG. 1 depicts a Java ME application running on a mobile device.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Software platforms such as Java ME provide an attractive environment for developing mobile device applications. Rather than writing multiple versions of the software, each targeting a different subset of device architectures, a single Java ME application can run the same code on a wide variety of devices. This decreases time to market and development cost while increasing software reliability. However, some device features may not be available to applications in the virtual machine environment, even though the feature may be well supported on many devices.

Native code running outside the virtual machine can access such features, but providing this native code has proven difficult. Mobile device users frequently do not have the time or the interest to understand how native features would improve their virtual machine applications, to seek out and download native code providing those features, to verify that they have the proper version of the native code, to install it on the device, to configure their virtual machine applications for the use of this native code, and to keep the virtual machine and native code versions synchronized during upgrades. As a result, utilization of native code features by virtual machine applications remains low.

Techniques of the present invention enable packaging native program extensions with virtual machine applications. Native code providing access to native device features is bundled inside a virtual machine application. When the virtual machine application runs, it detects when an operation would benefit from or be enhanced by a native feature not offered by the virtual machine. The application extracts the bundled native code and installs it on the mobile device. The native code is then loaded into memory and executed on the device. The virtual machine application communicates with the native code using inter-process communication. This allows the application to send and receive messages requesting the native code to access native features and return any results. From the user's perspective, the virtual machine application provides the benefits of a native application without requiring any extra work from the user on some devices. Other devices may require minimal interaction, prompting the user only to approve the native code install. Updating the virtual machine application to a new version automatically updates the bundled native code as well, eliminating synchronization issues. In fact, some embodiments may operate so seamlessly that a user is unaware of the existence of native program extensions on the device.

FIG. 1 depicts a Java ME application running on a mobile device. The Java ME application 114 runs inside a Java Virtual Machine 110. The application can access CLDC libraries 111 and MIDP libraries 112, which are standard parts of the Java ME platform. Optional libraries 113 can include other libraries from the Java ME platform which are not required to be present. They may also include proprietary Java libraries provided by the device manufacturer. Application 114 and libraries 111-113 comprise Java bytecode that runs on the Java Virtual Machine rather than the mobile device's processor.

The Java Virtual Machine itself comprises native code written for the device processor. Thus the Java Virtual Machine runs as a user process 103 on the device, just as an ordinary native program would. The term "process" here denotes a running program, while the modifier "user" indicates that the program runs in an unprivileged mode that can not directly access some or all of the device hardware and operating system data structures. By contrast, a system process or kernel process has more privileges to directly access the hardware and data structures. Such privileged processes normally only run operating system code. A user process wishing to access the hardware does so indirectly through an operating system API. This is represented in the figure by operating system 102 sitting between user process 103 and hardware 101. Some operating systems do not enforce privilege separation. In this case, there is little distinction between user processes and system processes. Operating system 102 would still provide an API for interacting with hardware 101, but user process 103 could also access the hardware directly.

Figure 2:
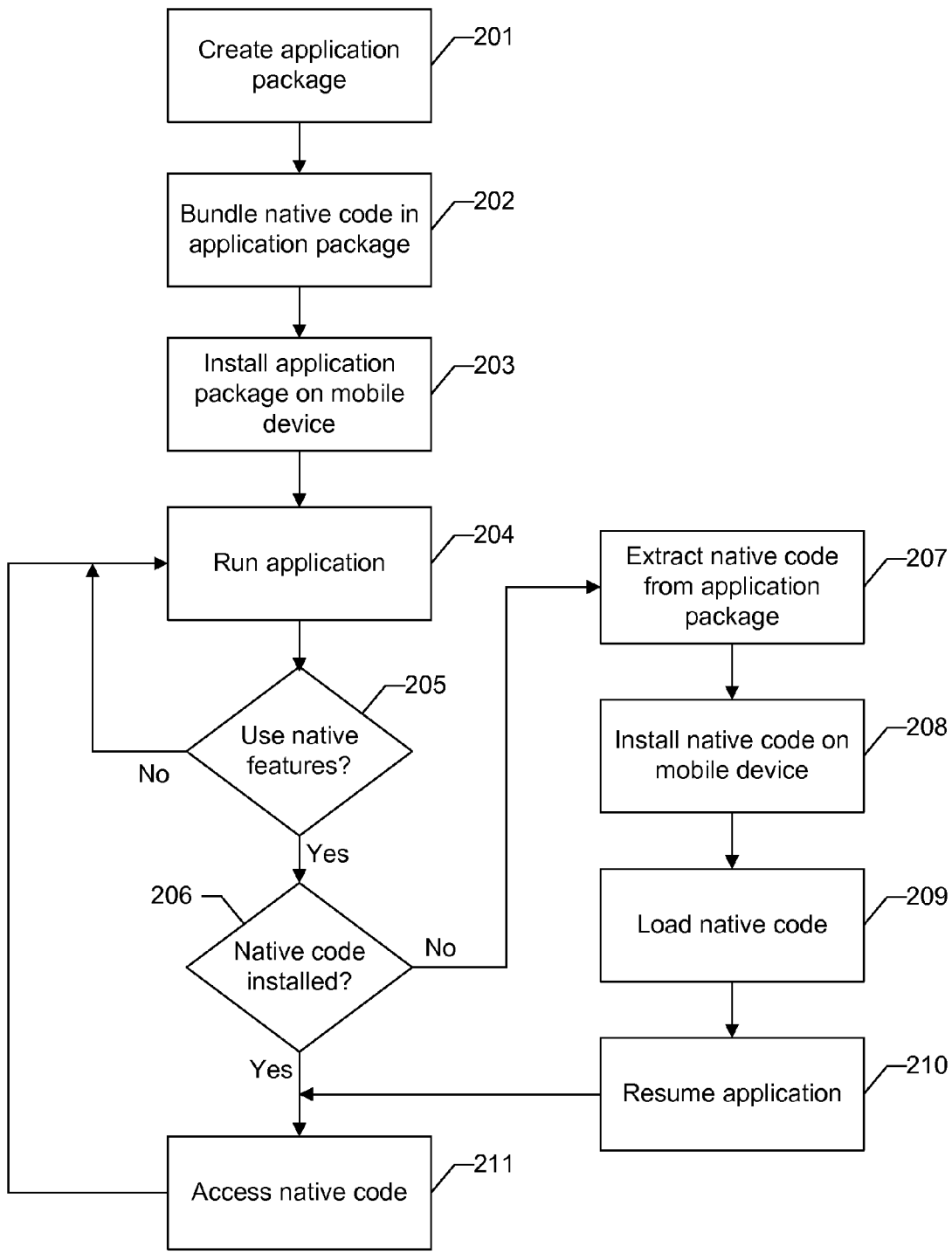
FIG. 2 is a flowchart illustrating an embodiment of packaging native program extensions with a virtual machine application.

FIG. 2 illustrates an embodiment of packaging native program extensions with a virtual machine application. An application package 201 is created for the target platform. The application package typically contains the code needed to run the application and any additional resources used by the application, such as icons, sounds, help files, etc. These items are often bundled in a single file such as a zip file comprising the application package. For example, Java ME applications are packaged as a Java Archive (JAR) file, which is a zip file containing the class bytecode files, other resource files, and a manifest file describing the contents.

The virtual machine application contained in application package 201 may need to access native features on certain devices. Native features are features provided by the device hardware or operating system to which the virtual machine does not grant access. Such features can be accessed by running native code outside the virtual machine on the mobile device. In some implementations, the native code is written for a particular device or class of related devices, such as devices sharing a common hardware architecture or operating system. In other implementations, the native code may run on a wide range of devices using a cross-platform compatibility library. In still others, the native code may include multiple native code files, each written for a different set of devices. For example, the native code may contain one file of native code for Blackberry devices, a second file of native code for Nokia devices, and a third for Motorola devices.

This native code is bundled 202 in the application package similar to other resource files as previously discussed. The application package may then be installed 203 on a mobile device. The installation method varies with the particular device and application package being used. Some devices simply copy the application package to local storage. Others may copy the application package to a certain location, such as a directory for application programs (much like the "Program Files" folder on Windows). Still others may extract the individual code and resource files from the package or update a registry to indicate the application has been installed. For instance, installing a Java application usually involves copying the JAR file containing the application to a certain directory in the device's file system.

Whichever installation method a device implements, the user is typically shielded from the details. The user simply requests for the application to be installed and the system handles the rest. How this is done varies by device. On some devices, the user may so initiate installation by selecting the application package on a web page within the device's web browser. On others, the user may select the application package in a device synchronization program on a desktop computer.

Once the application is installed, it may be run 204 on the device. Parts of the application which use only features of the virtual machine can be used right away. For instance, if the virtual machine allows opening TCP/IP connections, then the application may allow the user to engage in a wide range of activities enabled by such connections, e.g., check email, participate in instant messaging chats, or get weather updates.

However, some parts of the application require access to native features of the device. As an example, a mapping application may need to access GPS or cell tower data to automatically plot the device's current location. As another example, a messaging application may need to access the phone's Personal Information Management (PIM) data such as email messages or contact details such as names, addresses, and numbers. As a further example, an application may need to place or receive phone calls using the device. Native features can also include a storage location on the computing device, a Short Message Service (SMS) or other text messaging service, an image capture component such as a still or video camera, communication over a Universal Serial Bus (USB) port, or any number of other device features. If such a native feature of the device is not available within the virtual machine, then native code is needed to access that feature. The application detects whether access to a native feature is required 205. If not, the virtual machine application continues to run 204. Otherwise, the application checks whether the required native code has been installed 206 on the device before.

If the native code has not been installed previously, the application initiates the process by which the native code bundled with the application is made ready for use. The native code cannot be executed inside the virtual machine application. The native code comprises native machine instructions which run directly on the device processor. The virtual machine does not understand this code. Further, mechanisms to run the native code alongside the virtual machine such as JNI are not reliably present on every device. Therefore the native code should typically be run in a separate process.

Previously, setting up native code for use with a virtual machine application required an undesirable amount of manual intervention from the user. First, the application would have to make the user aware that certain features were unavailable. Then the application had to inform the user that the mobile device was capable of those features using native code. The user would then be informed that installing the native code would enable those features in the virtual machine application. Next the user would have to decide if the native features were worthwhile and whether to install the native code. If the user chose to proceed, he would have to locate the native code, download it, load the code onto his device, and initiate the installation process. A user might elect not to install the native code at any of these stages for a variety of reasons: worries about storage space, worries about insecure or malicious code, lack of time, not understanding the procedure, etc.

Techniques of the present invention allow installing and using native code without introducing the obstacles associated with these tedious and error-prone interactions. The application extracts the native code files for the current device from the application package 207, where they are bundled with other resources. The extracted native code can be stored in local storage, in memory, or anywhere else the device allows. Once extracted, the native code files will be visible to the operating system. The virtual machine application then installs the native code on the mobile device 208. This may performed directly by the application if the virtual machine allows the necessary operations. For instance, if installed code must be placed in a certain directory on the device and the application is allowed to create files in that directory, then the application may copy the extracted code there. More typically, however, installing code requires action by the operating system. In this instance, the virtual machine application would provide the operating system with the extracted native code files and request that they be installed.

Once installed, the native code must be loaded into memory 209 where it can execute. In certain embodiments, this involves launching a native program containing the native code. This creates a user process to run the native code separate from the user process running the virtual machine. On some systems, there may be little or no distinction between (file) storage and (process) memory, eliminating the need for this operation.

After the native code is loaded into memory and running, the virtual machine application can resume its execution. Now the virtual machine application may access the running native code 211 to gain use of native features. Access can occur through any type of inter-process communication allowed by the virtual machine. For instance, the native code process can open a network socket and listen for messages. When the virtual machine application requires a native feature, it can connect to the network socket and pass a message or data to the native code. The native code will process the data or message using the underlying device features which the virtual machine lacks. When the native code finishes processing the message or data, it can pass a result back to the virtual machine application over the network socket. The virtual machine application can then incorporate the result into the application.

An example may be instructive. Suppose as in a previous example that a mapping application in the virtual machine wants to show the device's current position on a map. However, the virtual machine does not support the device's GPS feature. After installing and loading native code as described, the mapping application can connect to the running native code over a network socket and request the current GPS data. The native code, which has direct access to the device's features, queries the GPS component for the current location. The native code then returns this data to the mapping application over the network socket. The mapping application displays a map showing the device's current location, using the GPS data which it could not access inside the virtual machine.

The virtual machine application and the native code may communicate through any type of inter-process communication on the device. Network sockets, local sockets, pipes, and shared memory are all contemplated, along with numerous other possibilities. The processes can even communicate through a file system, writing outbound messages to one file and monitoring another file for incoming messages. Many such techniques are well known in the art.

Figure 3A:
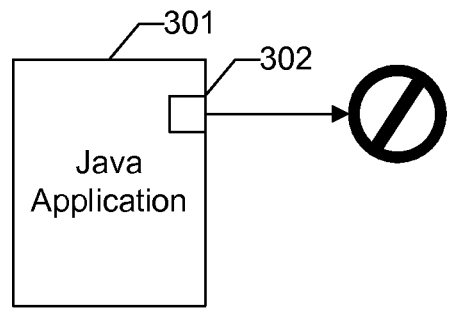
FIG. 3 depicts a particular implementation of a Java application using bundled native program extensions.

FIGS. 3a-e depict a particular implementation of a Java ME application using bundled native program extensions. The features described here represent particular embodiments and should not be construed as limiting the invention to the described implementations. In FIG. 3a, Java Application 301 is a running process in the memory of a mobile device. Java Application 301 runs in an environment similar to that depicted in FIG. 1. For simplicity, only a representation of the application is shown here.

Java Application 301 needs to use native features of the mobile device. To detect whether the required native code is installed, the application opens a local socket 302 and attempts to connect to a certain port. When the native code is installed and running, it listens for messages on this port. However, in this case the native code has not been installed. There is no native code process listening on the port. The application's attempt to connect fails.

Figure 3B:
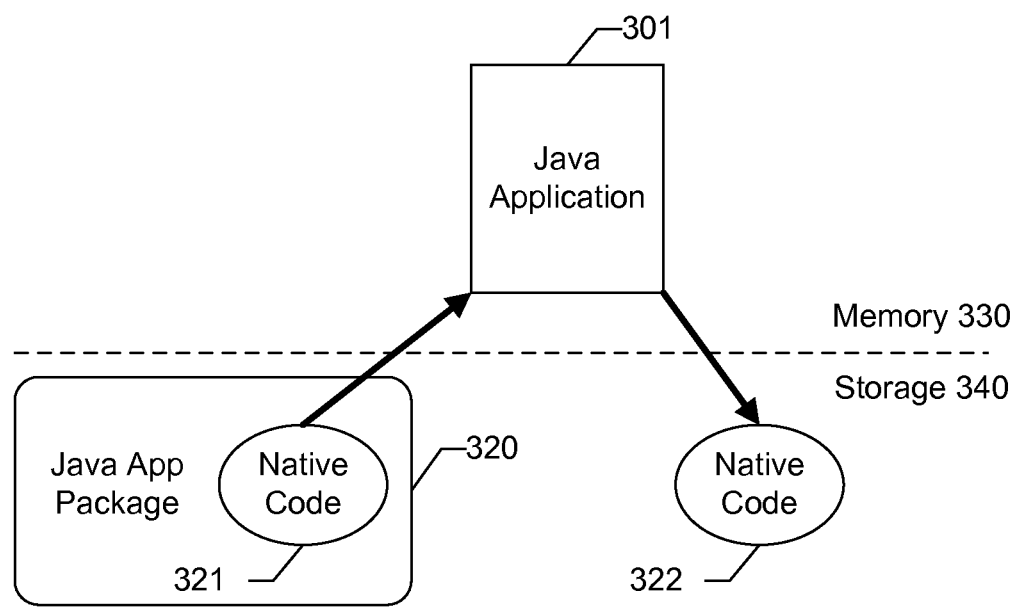

Having determined that the native code is not available, Java Application 301 begins the install process. FIG. 3b shows Java Application 301 running in device memory 330. Memory 330 is any type of memory suitable for executing processes. Typically, memory 330 might comprise volatile Random Access Memory (RAM) on the mobile device. By contrast, storage 340 represents nonvolatile memory for storing files and other persistent data on the mobile device. This is often implemented using flash memory, either built into the device or on removable media cards. Storage 340 contains Java Application Package 320, which is a JAR file containing the bytecode for Java Application 301 and other resources. One of those resources is Native Code 321. This native code is configured to run on the mobile device in a separate process outside the Java virtual machine. When executed, Native Code 321 allows Java Application 301 to access native features of the mobile device. To make the native code visible to the operating system, Java Application 301 extracts Native Code 321 from the Java application package and stores a copy Native Code 322 elsewhere in storage. For this example, Native Code copy 322 comprises a single file. Various embodiments allow multiple files, directory structures, embedded or archived files, and other combinations and variations known in the art.

Figure 3C:
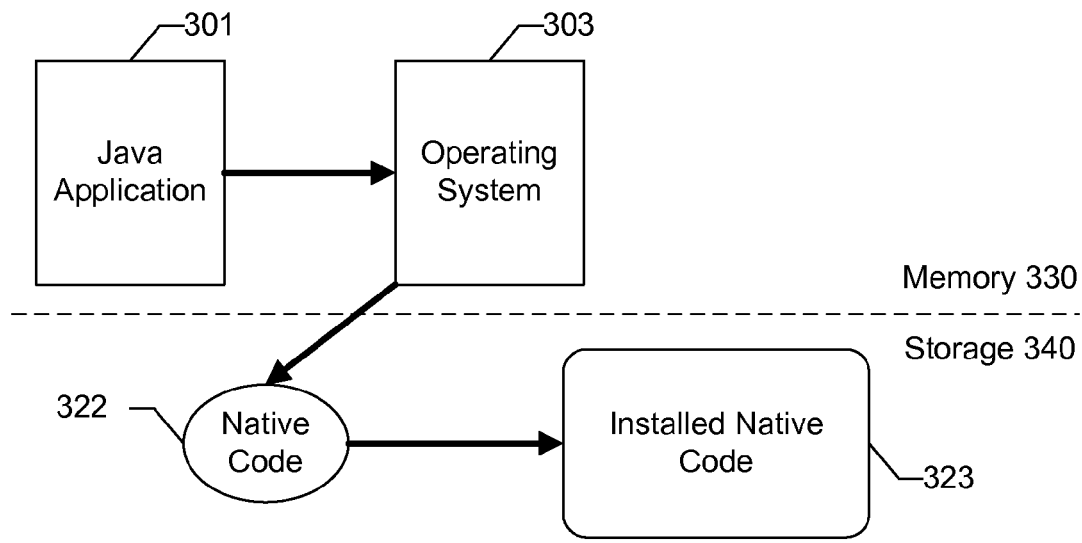

In FIG. 3c, Java Application 301 requests Operating System 303 to install the native code. Native Code 322 is installed in storage location Installed Native Code 323. The install process may involve a number of operations, including one or more of copying the native code files to a certain directory, extracting native code files from a native installer package (similar to a JAR file, but designed for native programs on a particular mobile device), updating system data structures such as a program registry, or executing pre- or post-install commands.

Requesting installation from the operating system is not as straightforward as it may appear. Java Application 301 can only interact with the operating system in limited ways. The MIDP/CLDC environment provides no API for a java application to install another program, and the Java virtual machine does not allow direct access to operating system functions. To get around these limitations, Java Application 301 uses the MIDP function platformRequest. This method accepts a URL, which it passes to the operating system. The operating system invokes a handler based on the content type indicated by the URL. For instance, calling platformRequest ("http://www.yahoo.com") would ask the operating system to handle the URL "http://www.yahoo.com". The operating system might respond by opening the device's web browser and navigating to the given URL. Similarly, a call such as platformRequest("tel:+408-555-1234") might be handled by dialing the telephone number 408-555-1234 on the device.

Java Application 301 takes advantage of this feature by constructing a URL to the native code that triggers the system installation process. For example, phones based on the Symbian operating system use a package format called Symbian Installation Source (SIS). A SIS file contains a .pkg file containing installation information, native code, and other resources. When a Symbian device encounters a file or URL ending in .sisx (or the older .sis), it triggers the installation procedure on that object. Java Application 301 uses this to install the native code on a Symbian device. The Java Application creates a .sisx file when it extracts the native code to local storage. In this instance, Native Code 322 might be a file named nativecode.sisx containing the native code and other required resources (such as a .pkg file). Suppose the file is saved in a directory called tmp. Java Application 301 constructs the URL file:///tmp/nativecode.sisx pointing to the SIS file with native code in local storage. Then it calls platformRequest ("file:///tmp/nativecode.sisx") to pass this URL to the native handler. The operating system recognizes the URL ending in .sisx as a Symbian installation package and performs the installation procedure on the native code file.

Figure 3D:
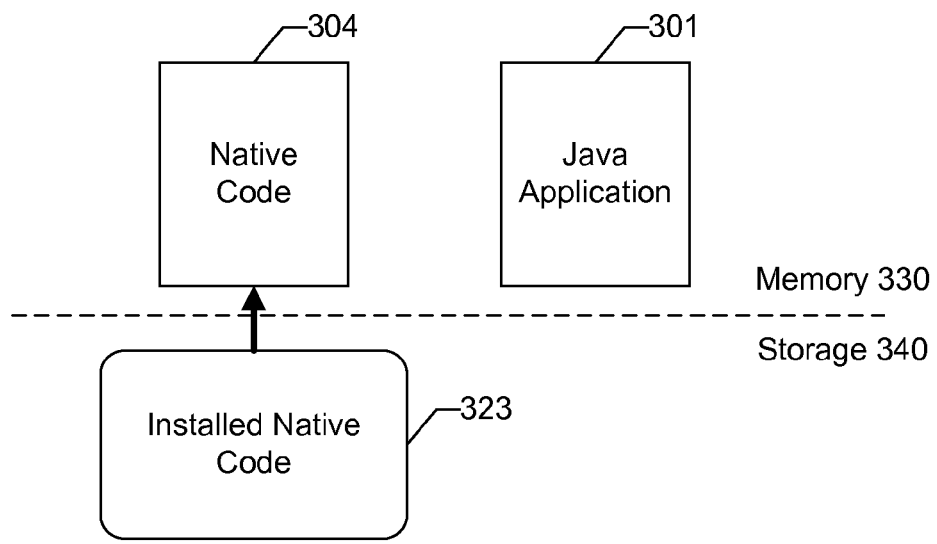

After the native code is installed, it must be loaded into memory to execute. FIG. 3d depicts this operation. The executable code is loaded from Installed Native Code 323 in storage 340 into memory 330. Here it executes in a user process as Native Code 304. Loading the native code may be performed by the operating system after the install. In some implementations, the operating system may load every program into memory immediately after installation. In others, the native code installation package may contain instructions to load the native code after the installation process.

Figure 3E:
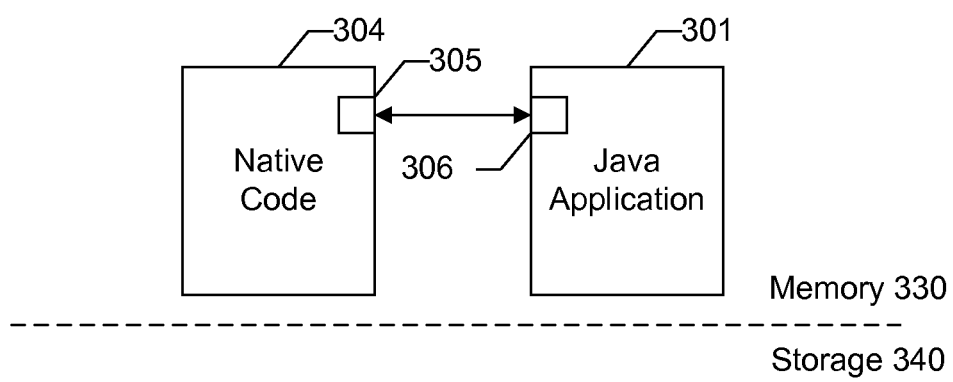

Once Native Code 304 executes, it opens a local socket 305 and waits for messages from Java Application 301, as shown in FIG. 3e. Java Application 301 now resumes running to contact Native Code 304. In implementations where the mobile device supports concurrent processing, Java Application 301 may periodically attempt to connect to socket 305 after initiating the native code install. Alternatively, Java Application 301 may suspend execution until receiving an indication that Native Code 304 is ready to receive messages.

When both processes are ready, Java Application 301 opens socket 306 and connects to Native Code 304 at socket 305 on a given port. The application and the native code exchange messages as described herein to allow the Java application to access native features of the mobile device. The message protocol may be application-dependent or an already standardized protocol like Obex. Those of skill in the art will realize a wide range of possibilities.

Although certain devices and environments have been assumed for explanation purposes, embodiments of the present invention may be employed in any of a wide variety of computing contexts. For instance, the user application described need not run inside a virtual machine. Some environments provide sandboxing of native code applications. Although the sandboxing techniques may differ greatly, the end result to the application is virtually the same. The invention can be readily practiced in any environment which restricts access to system features. The restricted environment need not even be explicitly sandboxed. For example, a Python or Ruby application runs in an interpreter which may not provide full access to the underlying system. The techniques described herein may be used just as effectively in those types of environments.

Figure 4:
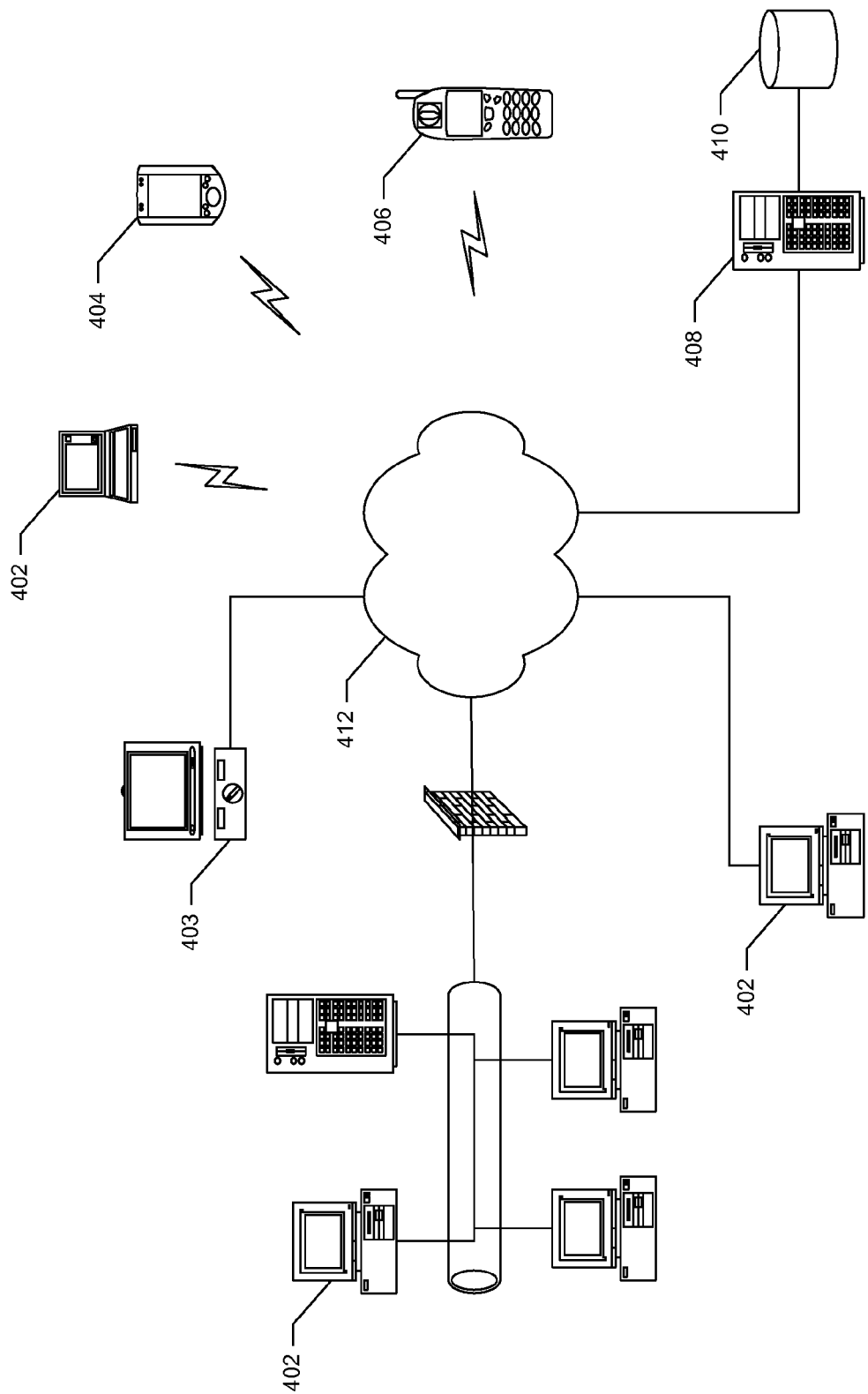
FIG. 4 is a simplified diagram of a computing environment in which embodiments of the present invention may be implemented.

Similarly, the invention is not limited to mobile devices. Those devices provide a useful example of an environment where virtual machine applications are preferable to native ones. However, the present invention may be practiced on any type of computing device, as illustrated in FIG. 4. Implementations are contemplated in which the relevant population of users interact with a diverse network environment via any type of computer (e.g., desktop, laptop, tablet, etc.) 402, media computing platforms 403 (e.g., cable and satellite set top boxes and digital video recorders), handheld computing devices (e.g., PDAs) 404, cell phones 406, or any other type of computing or communication platform. Many consumer media devices such as televisions, satellite receivers, cable boxes, digital video recorders, DVD players, and the like now ship with an embedded Java virtual machine. The advantages of the present invention on such devices are even more pronounced, where downloading and installing native extensions independently of a java application may prove difficult or impossible.

In addition, the computer program instructions with which embodiments of the invention are implemented may be stored in any type of non-transitory computer-readable storage media, and may be executed according to a variety of computing models including a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computing device, comprising:
    a processor;
    one or more memories;

a data structure stored in the one or more memories, the data structure comprising a virtual machine application package containing a virtual machine application and native code; and computer program instructions stored in the one or more memories, the computer program instructions comprising:

first instructions configured to implement an operating system when executed by the processor, the operating system being configured to provide a communication mechanism for processes on the computing device to communicate, the operating system being further configured to provide an installation mechanism to install programs on the computing device;

second instructions configured to implement a virtual machine when executed by the processor, the virtual machine being configured to run the virtual machine application, the virtual machine not being configured to provide access to one or more features of the computing device;

third instructions comprising the native code configured to run outside the virtual machine when executed by the processor, the native code being configured to provide access to the one or more features via the communication mechanism provided by the operating system; and fourth instructions comprising the virtual machine application, the virtual machine application being configured for execution by the virtual machine, to:

detect whether the native code is installed on the computing device;

automatically install the native code embedded in the virtual machine application package via the installation mechanism provided by the operating system if the native code is not detected; and access the one or more features of the computing device by communicating with the native code via the communication mechanism provided by the operating system.

2. The computing device of claim 1 wherein the virtual machine application is further configured to copy the native code embedded in the virtual machine application package to the one or more memories before installing the native code onto the computing device.

3. The computing device of claim 1 wherein the one or more features are selected from the group consisting of (i) an active cellular tower identifier, (ii) a Global Positioning System (GPS) location, (iii) a storage location on the computing device, (iv) a text messaging service, (v) an image capture component, (vi) a Universal Serial Bus (USB) port, (vii) a Personal Information Management (PIM) component, and (viii) a telephone call dialer or receiver.

4. The computing device of claim 1 wherein the communication mechanism comprises a local communication mechanism within the computing device.

5. The computing device of claim 1 wherein the installation mechanism comprises providing a handler on the computing device with the location of an installation package containing the native code.

6. The computing device of claim 1 wherein the virtual machine application is further configured to install the native code if a previously installed version of the native code on the computing device differs from the native code embedded in the virtual machine application package.

7. The computing device of claim 1 wherein the computer program instructions further comprise fifth instructions configured to install the virtual machine application package with the embedded native code on the computing device.

8. The computing device of claim 1 wherein the operating system is further configured to prompt a user of the computing device to run the installation mechanism.

9. A computer program product for use on a computing device that includes an operating system and a virtual machine, the operating system being configured to provide a communication mechanism for processes on the computing device to communicate, the operating system being further configured to provide an installation mechanism to install programs on the computing device, the virtual machine being configured to run a virtual machine application, the computer program product comprising at least one non-transitory computer-readable storage medium comprising:

a data structure including a virtual machine application package, the virtual machine application package storing thereon computer-readable instructions, comprising:

first instructions comprising native code configured to run outside the virtual machine when executed by a processor of the computing device, the native code being configured to provide access to one or more features of the computing device via the communication mechanism provided by the operating system, the virtual machine not being configured to provide access to the one or more features of the computing device; and second instructions comprising the virtual machine application, the virtual machine application being configured for execution by the virtual machine, to:

detect whether the native code is installed on the computing device;

automatically install the native code embedded in the virtual machine application package via the installation mechanism provided by the operating system if the native code is not detected; and access the one or more features of the computing device by communicating with the native code via the communication mechanism provided by the operating system.

10. The computer program product of claim 9 wherein the virtual machine application is further configured to copy the native code embedded in the virtual machine application package to a storage location on the computing device before installing the native code onto the computing device.

11. The computer program product of claim 9 wherein the one or more features are selected from the group consisting of (i) an active cellular tower identifier, (ii) a Global Positioning System (GPS) location, (iii) a storage location on the computing device, (iv) a text messaging service, (v) an image capture component, (vi) a Universal Serial Bus (USB) port, (vii) a Personal Information Management (PIM) component, and (viii) a telephone call dialer or receiver.

12. The computer program product of claim 9 wherein the virtual machine application is further configured to install the native code if a previously installed version of the native code on the computing device differs from the native code embedded in the virtual machine application package.

13. A method, comprising:

implementing an operating system when executed by a processor of a computing device, the operating system being configured to provide a communication mechanism for processes on the computing device to communicate, the operating system being further configured to provide an installation mechanism to install programs on the computing device;

implementing a virtual machine when executed by the processor, the virtual machine being configured to run a virtual machine application of a virtual machine application package, the virtual machine not being configured to provide access to one or more features of the computing device, wherein the virtual machine application package further includes native code configured to run outside the virtual machine when executed by the processor, the native code being configured to provide access to the one or more features via the communication mechanism provided by the operating system;

wherein the virtual machine application is configured for execution by the virtual machine for:

detecting whether the native code is installed on the computing device;

automatically installing the native code embedded in the virtual machine application package via the installation mechanism provided by the operating system if the native code is not detected; and accessing the one or more features of the computing device by communicating with the native code via the communication mechanism provided by the operating system.

14. The method of claim 13 further comprising copying the native code embedded in the virtual machine application package to a storage location on the computing device before installing the native code onto the computing device.

15. The method of claim 13 wherein the one or more features are selected from the group consisting of (i) an active cellular tower identifier, (ii) a Global Positioning System (GPS) location, (iii) a storage location on the computing device, (iv) a text messaging service, (v) an image capture component, (vi) a Universal Serial Bus (USB) port, (vii) a Personal Information Management (PIM) component, and (viii) a telephone call dialer or receiver.

16. The method of claim 13 wherein the virtual machine application communicates with the native code via a local communication mechanism within the computing device.

17. The method of claim 13 wherein installing the native code comprises providing a handler on the computing device with the location of an installation package containing the native code.

18. The method of claim 13 wherein the installation of the native code is also initiated by the virtual machine application if a previously installed version of the native code on the computing device differs from the native code embedded in the virtual machine application package.

19. The method of claim 13 further comprising installing the virtual machine application package with the embedded native code on the computing device.

20. The method of claim 13 further comprising prompting a user of the computing device to install the native code.

* * * * *